US010819951B2

(12) United States Patent
Zhou et al.

(10) Patent No.: US 10,819,951 B2
(45) Date of Patent: Oct. 27, 2020

(54) RECORDING VIDEO FROM A BITSTREAM

(71) Applicant: Microsoft Technology Licensing, LLC, Redmond, WA (US)

(72) Inventors: You Zhou, Sammamish, WA (US);
Chih-lung Lin, Redmond, WA (US);
Mei-Hsuan Lu, Bellevue, WA (US);
Binlong Li, Redmond, WA (US);
Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 15/425,967

(22) Filed: Feb. 6, 2017

(65) Prior Publication Data

US 2018/0152670 A1    May 31, 2018

Related U.S. Application Data

(60) Provisional application No. 62/428,238, filed on Nov. 30, 2016.

(51) Int. Cl.
| | |
|---|---|
| *H04N 7/15* | (2006.01) |
| *H04L 12/18* | (2006.01) |
| *G11B 27/30* | (2006.01) |
| *G11B 27/36* | (2006.01) |
| *H04N 21/4402* | (2011.01) |
| *H04N 5/765* | (2006.01) |
| *H04N 21/433* | (2011.01) |

(52) U.S. Cl.
CPC ......... *H04N 7/155* (2013.01); *G11B 27/3081* (2013.01); *G11B 27/36* (2013.01); *H04L 12/1831* (2013.01); *H04N 5/765* (2013.01); *H04N 21/4334* (2013.01); *H04N 21/440218* (2013.01)

(58) Field of Classification Search
CPC ....................................................... H04N 7/155
USPC ............................................................. 386/326
See application file for complete search history.

(56) References Cited

U.S. PATENT DOCUMENTS

| | | | |
|---|---|---|---|
| 6,249,551 B1 | 6/2001 | Yamaguchi | |
| 6,542,549 B1 | 4/2003 | Tan et al. | |
| 2006/0088286 A1* | 4/2006 | Shibata | H04N 5/76 386/344 |
| 2006/0133775 A1 | 6/2006 | Ju | |
| 2008/0187046 A1 | 8/2008 | Joch et al. | |
| 2010/0208828 A1 | 8/2010 | Lu et al. | |
| 2010/0309975 A1 | 12/2010 | Zhou et al. | |
| 2010/0329457 A1* | 12/2010 | Miller | H04N 7/0135 380/200 |

(Continued)

FOREIGN PATENT DOCUMENTS

WO    2000022820 A1    4/2000

OTHER PUBLICATIONS

Conditional Re-encoding method for Cryptanalysis-ResistantBy: Seungkwang Lee; Dooho Choi; Yong-Je Choi. ETRI Journal. Oct. 2015, vol. 37 Issue 5, p. 1012-1022. 11p. (Year: 2015).*

(Continued)

*Primary Examiner* — Eileen M Adams
*Assistant Examiner* — Daniel T Tekle
(74) *Attorney, Agent, or Firm* — NovoTechIP International PLLC

(57) ABSTRACT

Techniques for recording video from a bitstream are described. In at least some implementations, video data generated as part of a communication session is recorded. According to various implementations, techniques described herein enable portions of an encoded bitstream of video data to be directly recorded as encoded frames and without requiring re-encoding of decoded frames.

25 Claims, 13 Drawing Sheets

(56) References Cited

U.S. PATENT DOCUMENTS

| | | |
|---|---|---|
| 2011/0271092 A1* | 11/2011 | Brelay ................. G11B 27/005 713/150 |
| 2011/0274178 A1 | 11/2011 | Onno et al. |
| 2012/0155546 A1 | 6/2012 | Marpe et al. |
| 2014/0369422 A1* | 12/2014 | Wang ............... H04N 21/44021 375/240.26 |
| 2015/0127847 A1 | 5/2015 | Rodriguez et al. |
| 2015/0131729 A1 | 5/2015 | Laroche et al. |

OTHER PUBLICATIONS

Conditional Re-encoding method by Seungkwang Lee; Dooho Choi; Yong-Je ZChoi ETRI Jouranl Oct. 2015 vol. 37 issue 5, p. 1012-1022 (Year: 2015).*

Methods and Apparatus for improved motion estimation for video encoding by Charles W. Kurak, Jr Pts corporation (Year: 1999).*

Efficient Algorithms for Editing H. 263 and MPEG-4 Video on Mobile Terminals (Year: 2006).*

Harrington, et al., "Video File Format Overview", http://www.dpbestflow.org/Video_Format_Overview, Published on: Sep. 22, 2015, 9 pages.

Binh, et al., "A Better Bit-Allocation Algorithm for H.264/Svc", in Proceedings of the Fourth Symposium on Information and Communication Technology, Dec. 5, 2013, pp. 18-26.

Li, et al., "Bi-Level Video: Video Communication at Very Low Bit Rates", in Proceedings of the Ninth ACM International Conference on Multimedia, Sep. 30, 2001, pp. 392-400.

Islam, et al., "Efficient Algorithms for Editing 11.263 and MPEG-4 Videos on Mobile Terminals", In Proceedings of International Conference on Image Processing, Oct. 8, 2006, pp. 3181-3184.

* cited by examiner

RECORDING VIDEO FROM A BITSTREAM

RELATED APPLICATION

This application claims priority to U.S. Provisional Application No. 62/428,238, titled "Recording Video from a Bitstream" and filed on Nov. 30, 2016, the entire contents of which are incorporated by reference herein.

BACKGROUND

Modern communication systems have an array of capabilities, including integration of various communication modalities with different services. For instance, different communication media such as audio, video, and text can be exchanged between users over wired and wireless networks, such as the Internet. Of particular interest is the exchange of video as part of a communication session, such as real-time video streamed as part of a Voice over Internet Protocol (VoIP) call between different users.

Typically, frames of video transmitted between client devices are encoded by an encoder to compress the video into an encoded bitstream for transmission between the client devices. This reduces the data size of the video data and thus reduces network resources required to transmit the video data. Recording video data directly at the bitstream level, however, presents a number of implementation challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for recording video from a bitstream are described. In at least some implementations, video data generated as part of a communication session is recorded. According to various implementations, techniques described herein enable portions of an encoded bitstream of video data to be directly recorded as encoded frames and without requiring re-encoding of decoded frames.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Identical numerals followed by different letters in a reference number may refer to difference instances of a particular item.

DETAILED DESCRIPTION

Figure 1:
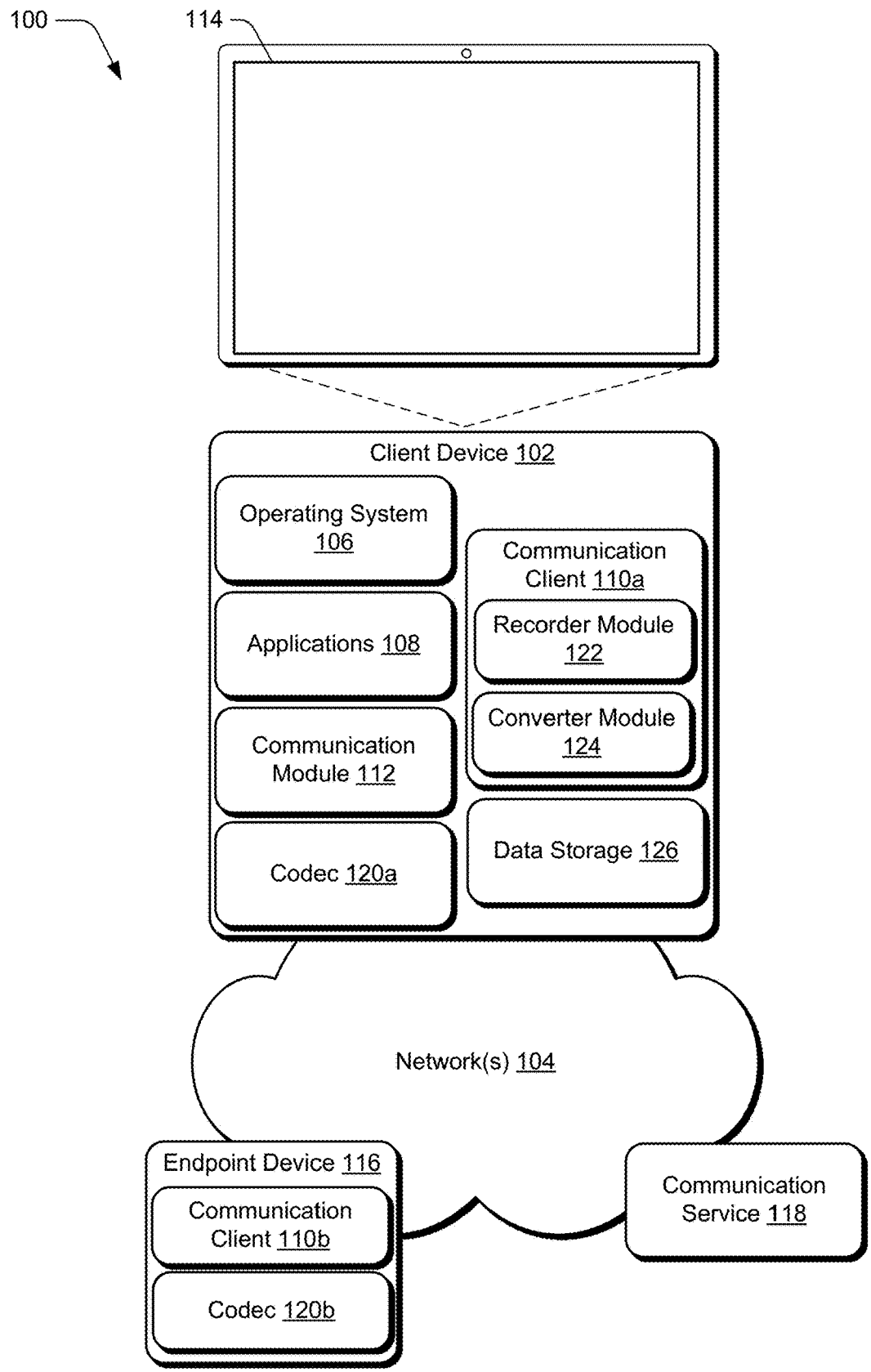
FIG. 1 is an illustration of an environment in an example implementation that is operable to employ techniques discussed herein.

Techniques for recording video from a bitstream are described. In at least some implementations, video data generated as part of a communication session is recorded. A communication session, for instance, refers to a real-time exchange of communication media between different communication endpoints. Examples of a communication session include a Voice over Internet Protocol (VoIP) call, a video call, a collaboration session, and combinations thereof.

According to various implementations, techniques described herein enable portions of an encoded bitstream of video data to be directly recorded as encoded frames and without requiring re-encoding of decoded frames. This avoids the resource-intensive re-encoding processes used by previous video recording techniques.

In at least some implementations, a recording process for recording video data is initiated after an encoded bitstream carrying the video data has been streaming for a time. That is, the recording process does not start at a first frame of the encoded bitstream. Typical encoding techniques, however, leverage differences between different frames of a bitstream, and thus rely on the availability of certain frames as reference frames. Accordingly, techniques described herein enable recording of an encoded bitstream of video data to start at any arbitrary frame.

For instance, consider a scenario where a user or some automated process initiates recording of video data. The user, for instance, starts recording by pressing a recording button or other control included as part of a communication client (e.g., a VoIP client) to record portions of a video communication session. Accordingly, techniques described herein determine whether a current encoded frame of an encoded bitstream carrying the video data is decodable using an available frame. If the current encoded frame is decodable, the encoded bitstream is recorded, starting with the current encoded frame, directly as an encoded bitstream and without requiring re-encoding of a decoded version of the encoded bitstream.

If the current encoded frame is not decodable, however, a decoded version of the encoded frame is captured. The decoded version, for instance, is copied from a decoded picture buffer (DPB) of a codec that decodes portions of the encoded bitstream. The decoded version is stored, along with encoded frames of the encoded bitstream that occur after the current encoded frame. To enable the decoded version of the frame and the encoded frames to be used to generate a decodable encoded bitstream, a conversion process encodes the decoded frame as an initial frame for a stored encoded bitstream. The decoded frame, for instance, is encoded as an Instantaneous Decoder Refresh (IDR) frame. The stored encoded frames are then concatenated to the initial frame to generate a stored encoded bitstream that can be stored for subsequent decoding and playback. As further detailed below, certain frame-related data can be modified to ensure that the stored encoded bitstream is compliant with a particular video coding standard and/or set of standards, such as H.264, H.265, and so forth.

Accordingly, techniques for recording video from a bitstream described herein enable portions of an encoded bitstream of video data to be recorded directly as encoded frames and without requiring re-encoding of decoded versions of the encoded frames. Further, compliance with video coding standards are maintained to enable a recorded bitstream to be decoded and played back. The described techniques also improve computing device performance by reducing memory resources required to store decoded video for subsequent encoding and storage, and by reducing processor bandwidth required to performed re-encoding of decoded frames prior to storage.

In the following discussion, an example environment is first described that is operable to employ techniques described herein. Next, some example implementation scenarios are described in accordance with one or more implementations. Following this, some example procedures are described in accordance with one or more implementations. Finally, an example system and device are described that are operable to employ techniques discussed herein in accordance with one or more implementations. Consider now an example environment in which example implementations may by employed.

FIG. 1 is an illustration of an environment 100 in an example implementation that is operable to employ techniques for recording video from a bitstream described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The client device 102 includes a variety of different functionalities that enable various activities and tasks to be performed. For instance, the client device 102 includes an operating system 106, applications 108, a communication client 110a, and a communication module 112. Generally, the operating system 106 is representative of functionality for abstracting various system components of the client device 102, such as hardware, kernel-level modules and services, and so forth. The operating system 106, for instance, can abstract various components of the client device 102 to the applications 108 to enable interaction between the components and the applications 108.

The applications 108 represent functionalities for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication client 110a is representative of functionality to enable different forms of communication via the client device 102. Examples of the communication client 110a include a voice communication application (e.g., a VoIP client), a video communication application, a messaging application, a content sharing application, a unified communication & collaboration (UC&C) application, and combinations thereof. The communication client 110a, for instance, enables different communication modalities to be combined to provide diverse communication scenarios.

The communication module 112 is representative of functionality for enabling the client device 102 to communicate data over wired and/or wireless connections. For instance, the communication module 112 represents hardware and logic for data communication via a variety of different wired and/or wireless technologies and protocols.

The client device 102 further includes a display device 114, which represents functionality for visual output for the client device 102. Additionally, the display device 114 represents functionality for receiving various types of input, such as touch input, pen input, and so forth.

The environment 100 further includes an endpoint device 116, which is representative of a device and/or functionality with which the client device 102 may communicate. In at least some implementations, the endpoint device 116 represents an end-user device such as discussed with reference to the client device 102. The endpoint device 116 includes a communication client 110b, which is representative of functionality to enable different forms of communication via the endpoint device 116. The communication client 110b, for example, represents a different instance of the communication client 110a.

In at least some implementations, the communication clients 110a, 110b represent interfaces to a communication service 118. Generally, the communication service 118 is representative of a service to perform various tasks for management of communication between the client device 102 and the endpoint device 116. The communication service 118, for instance, can manage initiation, moderation, and termination of communication sessions between the communication clients 110a, 110b.

The communication service 118 maintains a presence across many different networks and can be implemented according to a variety of different architectures, such as a cloud-based service, a distributed service, a web-based service, and so forth. Examples of the communication service 118 include a VoIP service, an online conferencing service, a UC&C service, and so forth.

The client device 102 further includes a codec 120a, and the endpoint device 116 includes a codec 120b. The codecs 120a, 120b are representative of functionalities for encoding and decoding content, such as for encoding and decoding a content stream (e.g., including video, audio, files, and so forth) that is generated as part of a communication session between the client device 102 and the endpoint device 116. The codecs 120a, 120b, for instance, are configured to perform compression and decompression of video data, such as to reduce transmission bandwidth required to transmit a video stream as part of a communication session between the communication client 110a and the communication client 110b.

Further to techniques for recording video from a bitstream described herein, the client device 102 includes a recorder module 122 and a converter module 124. As detailed herein, the recorder module 122 and the converter module 124 are representative of functionalities for enabling bitstream-level recording of video data. The recorder module 122, for instance, is representative of functionality to determine how to record portions of video, and to record raw, decoded frames of video along with encoded frames of video. The converter module 124 is representative of functionality to convert video data recorded by the recorder module 122 into a compressed bitstream that can be decompressed using a standard video coding format. The client device 102 also includes a data storage 126 that can be leveraged to store various data, such as for buffering and storing video data according to techniques described herein.

Having described an example environment in which the techniques described herein may operate, consider now a discussion of some example implementation scenarios for recording video from a bitstream in accordance with one or more implementations. The implementation scenarios may be implemented in the environment 100 discussed above, and/or any other suitable environment.

Figure 2:
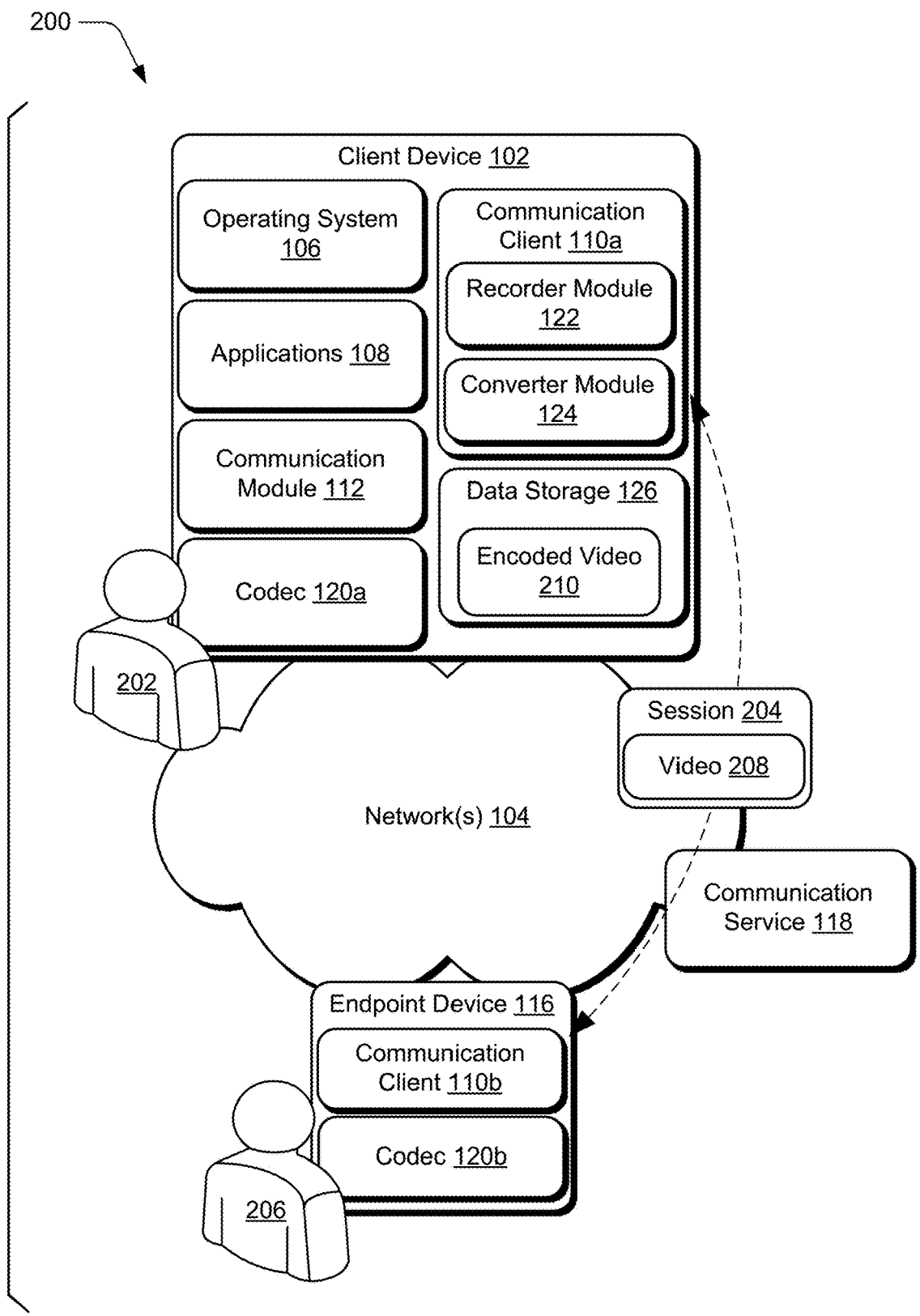
FIG. 2 depicts an example implementation scenario for recording a video bitstream in accordance with one or more implementations.

FIG. 2 depicts an example implementation scenario 200 for recording a video bitstream in accordance with one or more implementations. The scenario 200 includes various entities and components introduced above with reference to the environment 100.

In the scenario 200, a user 202 of the client device 102 is engaged in a communication session 204 with a user 206 of the endpoint device 116. Generally, the communication session 204 represents a real-time exchange of different communication media between the client device 102 and the endpoint device 116, such as audio, video, files, media content, and/or combinations thereof. In this particular example, the communication session 204 involves a real-time exchange of video data 208 from the endpoint device 116 to the client device 102 over the network 104.

According to various implementations, the video data 208 is encoded by the codec 120b prior to be transmitted to the client device 102. Thus, in order to be displayed at the client device 102, the video data 208 is decoded by the codec 120a.

Further to the scenario 200, the user 202 initiates an action to record the video data 208 at the client device 102. The user 202, for instance, selects a record control presented by the communication client 110a. Alternatively, some other action initiates recording of the video data 208, such as an automated process initiated by the communication client 110a. Thus, the communication client 110a initiates a process to record the video data 208 at the bitstream level. For instance, instead of a process where the video data 208 is decoded for display at the client device 102 and then re-encoded for recording as an encoded bitstream, the communication client 110a utilizes techniques for recording video from a bitstream described herein to record portions of the video data 208 as an encoded bitstream and without requiring re-encoding of decoded frames generated from the video data 208. Thus, as further detailed below, the recorder module 122 and the converter module 124 process the video data 208 in various ways to enable portions of the video data 208 to be recorded as encoded video data 210. Generally, the encoded video data 210 may be stored at the client device 102 (e.g., in the data storage 126) and/or the communication service 118 for later playback.

Figure 3:
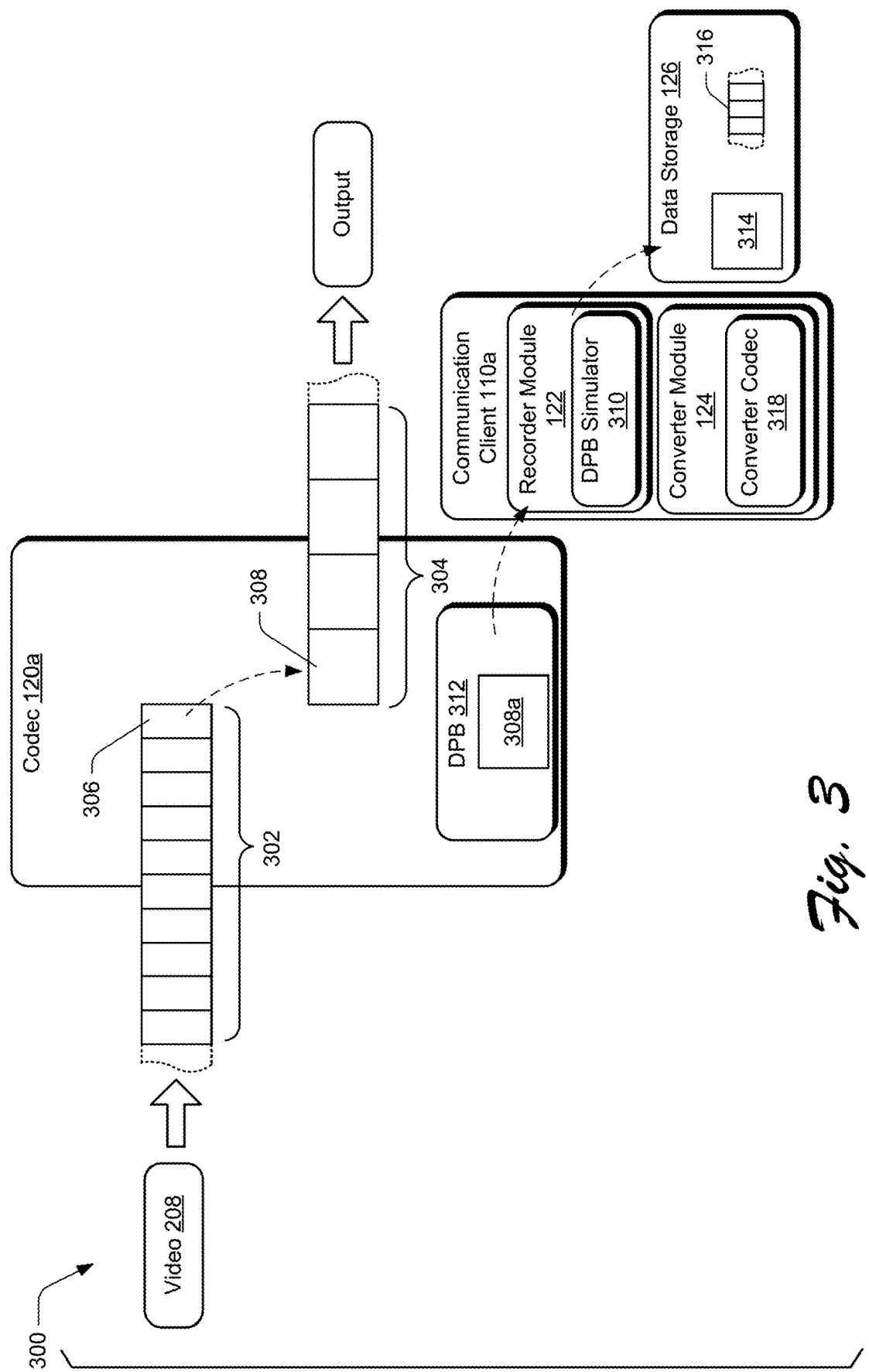
FIG. 3 depicts an example implementation scenario for recording a video bitstream in accordance with one or more implementations.

FIG. 3 depicts an example implementation scenario 300 for recording a video bitstream in accordance with one or more implementations. The scenario 300, for instance, represents a way of recording the video data 208 to generate the encoded video data 210 as described in the scenario 200, above.

The scenario 300 includes the video data 208, which represents an encoded bitstream 302 of encoded frames of video data. Generally, the encoded frames can include various types of frames, such as Instantaneous Decoder Refresh (IDR) frames, intra-frames (I-frames), predicted frames (p-frames), and so forth. The encoded bitstream 302 is received at the codec 120a and is decoded by the codec 120a to generate a decoded video stream 304. The decoded video stream 304, for instance, is output for display by the client device 102.

According to various implementations, a recording process for recording the video data 208 is initiated after initial portions of the encoded bitstream 302 are received at the client device 102 and decoded by the codec 120a to generate the decoded bitstream 304 for display. For instance, the user 202 initiates recording the video data 208 at a point where an encoded frame 306 is being decoded and a while after the video data 208 starts streaming to the client device 102, such as 30 seconds, a minute, and so forth. In this particular scenario, recording is initiated at a point where the encoded frame 306 is decoded to generate a decoded frame 308.

Thus, to record portions of the video data 208 from the received encoded bitstream 302 and without requiring decoding and re-encoding of all of the bitstream 302 at the client device 102 prior to recording, the recorder module 122 determines whether the encoded frame 306 is decodable independent of a previously-received encoded frame. To do this, the recorder module 122 determines a frame type for the frame 304. The recorder module 122, for instance, includes a decoded picture buffer (DPB) simulator 310 that has access to frame information from a decoded picture buffer (DPB) 312 of the codec 120a. Generally, the DPB 312 represents functionality of the codec 120a to store frames that have been decoded, as well as information about the frames. For example, the DPB 312 includes identification information for individual frames of the encoded bitstream 302, such as whether a particular frame is an IDR frame, an I-frame, a p-frame, and so forth. In this particular scenario, the DPB 312 stores a copy 308a of the decoded frame 308. The copy 308a, for instance, is buffered for a short time in case the copy 308a is a reference frame needed to decoded a subsequent encoded frame of the encoded bitstream 302. Thus, by accessing the DPB 312, the DPB simulator 310 determines whether the encoded frame 306 is an IDR frame, an I-frame, a p-frame, and so forth.

For instance, if the encoded frame 306 is an IDR frame, then the encoded frame 306 is decodable since it does not require a previously-received frame in order to be decoded. Thus, if the encoded frame 306 is an IDR frame, the recorder module 122 starts recording (e.g., storing) the encoded bitstream 302 from the encoded frame 306 in the data storage 126.

If the frame 306 is a p-frame or some other frame that references a previous frame, however, the recorder module 122 stores a frame copy 314 of the decoded frame 308 in the data storage 126. The recorder module 122 then stores encoded frames from the encoded bitstream 302 that follow the encoded frame 306 as a stored bitstream 316. The frame copy 314 generally represents a raw picture (i.e., an independent set of pixel values) that can be displayed on its own without reference to any other frames. As further detailed below, the frame copy 314 is encoded by a converter codec 318 to generate an encoded frame to which the stored bitstream 316 is concatenated to generate an encoded bitstream that can be decoded and played back.

Figure 4:
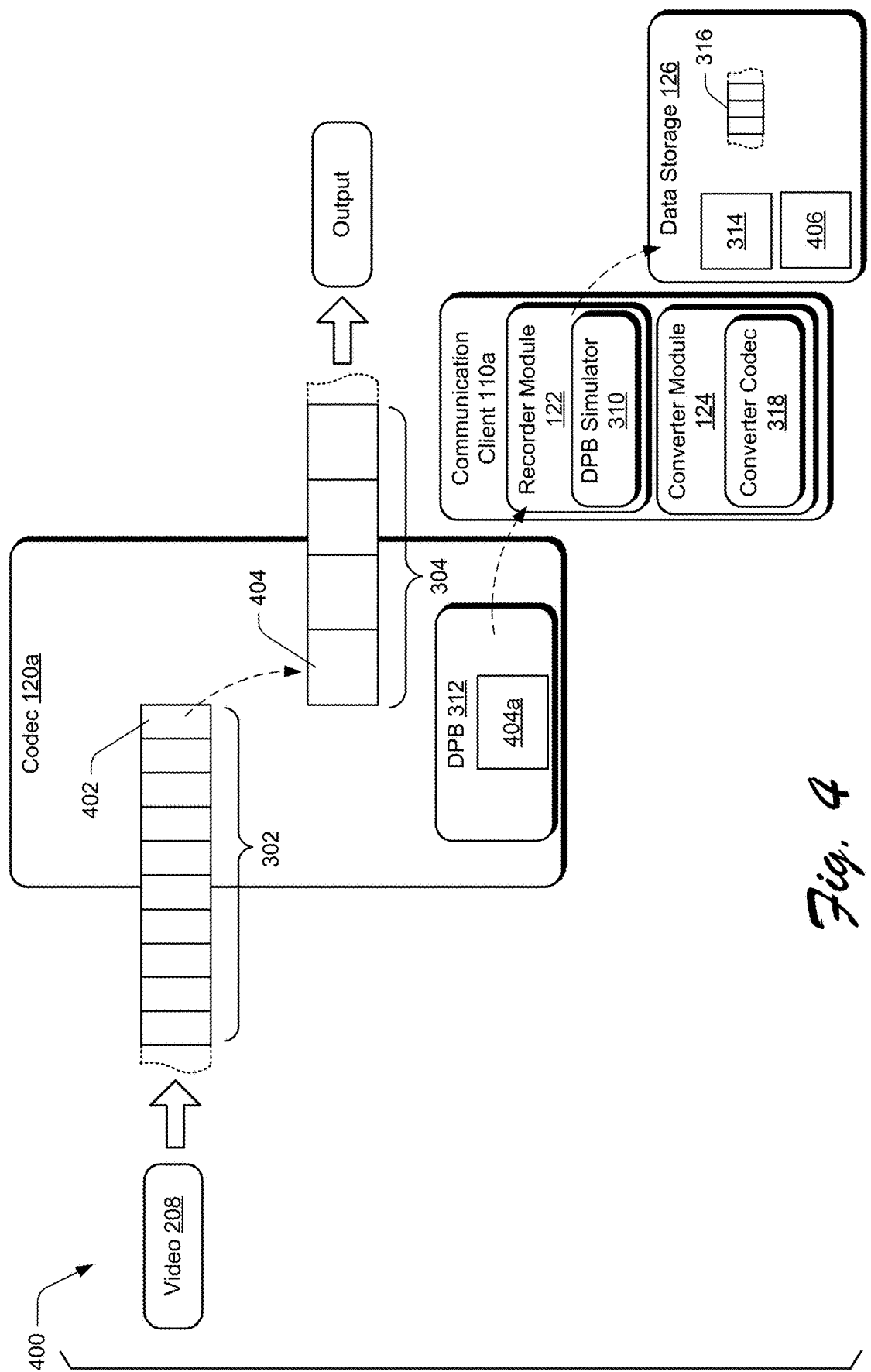
FIG. 4 depicts an example implementation scenario for recording a subsequent frame that is non-decodable in accordance with one or more implementations.

FIG. 4 depicts an example implementation scenario 400 for recording a subsequent frame that is non-decodable in accordance with one or more implementations. The scenario 400, for instance, represents a continuation of the scenario 300, above.

In the scenario 400, recording of the encoded bitstream 302 has begun, such as described above. For instance, the frame copy 314, which represents the first frame recorded, is captured and stored in the data storage 126. Further, subsequent encoded frames from the encoded bitstream 302 are captured and stored in the data storage 126 as the stored bitstream 316. As the subsequent encoded frames are being recorded, the DPB simulator 310 detects an encoded frame 402 that is non-decodable using an encoded frame from the stored bitstream 316. The encoded frame 402, for instance, is a p-frame that references an encoded frame that is not recorded in the data storage 126, e.g., is not included in the stored bitstream 316. For example, the encoded frame 402 references a frame from the encoded bitstream 302 that arrived and was decoded by the codec 120a prior to recording being initiated in the scenario 300, e.g., prior to the encoded frame 306. Thus, the referenced frame was not recorded by the recorder module 122 and is not available to decode the frame 402. A decoded version of the referenced frame, however, is included in the DPB 312 such that the codec 120a can decode the frame 402 to generate a decoded frame 404. Generally, the decoded frame 404 represents an image frame that is displayable as part of the decoded video stream 304. Further, the DPB 312 temporarily stores a copy 404a of the decoded frame 404.

Accordingly, the recorder module 122 captures a frame copy 406 of the copy 404a and stores the frame copy 406 in the data storage 126. As further detailed below, the frame copy 406 can be processed along with other frame data from the data storage 126 to generate an encoded video bitstream that can be decoded and played back.

Figure 5:
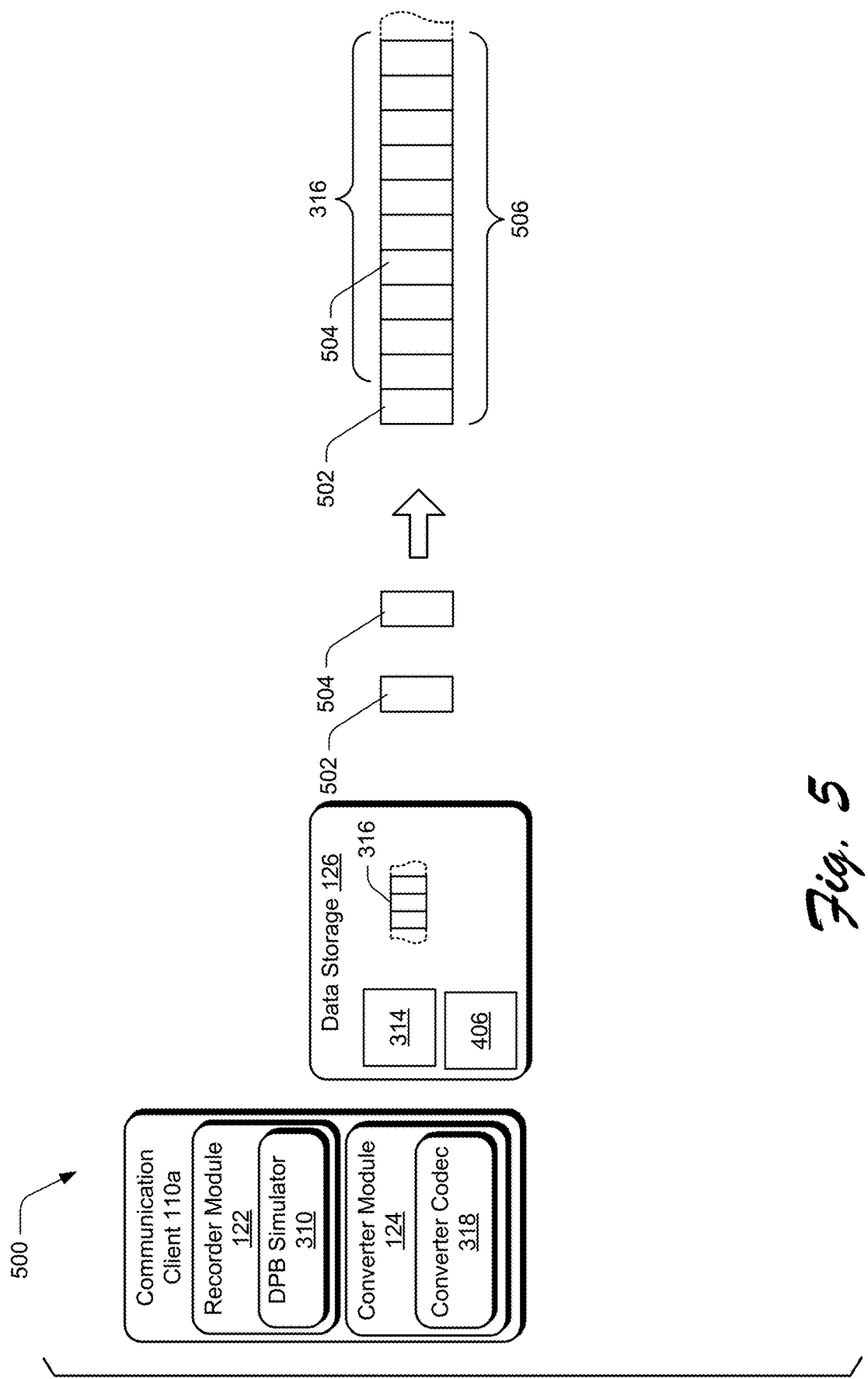
FIG. 5 depicts an example implementation scenario for generating a decodable video bitstream from portions of stored video data in accordance with one or more implementations.

FIG. 5 depicts an example implementation scenario 500 for generating a decodable video bitstream from portions of stored video data in accordance with one or more implementations. The scenario 500, for instance, represents a way of generating a decodable bitstream from video data stored as part of the scenarios 300, 400 discussed above.

The scenario 500 includes the frame copies 310, 406 and the stored bitstream 316. Accordingly, the converter module 124 processes this data in various ways to generate an integrated encoded bitstream.

For instance, since the frame copy 314 is a copy of the first frame captured from the video data 208, the converter module 124 generates an IDR frame using the frame copy 314. The converter codec 318, for instance, encodes the frame copy 314 as an IDR frame 502. Further, the converter module 124 generates various information for the IDR frame 502, such as a Sequence Parameter Set (SPS) data and the Picture Parameter Set (PPS) data. Generally, the SPS data includes information about the bitstream that is being generated, such as resolution, video format information, encoding information such as an encoding mode used to encode the bitstream, and so forth. The PPS data includes information about the IDR frame 502 and/or a combination of frames that include the IDR frame 502, such as picture size, resolution, encoding mode, and so forth.

Further to the scenario 500, the converter module 124 processes the frame copy 406 to generate an I-frame 504. The converter codec 318, for instance, encodes the frame copy 406 (a raw picture) as the I-frame 504. The converter module 124 then generates an encoded bitstream 506 by concatenating the stored bitstream 316 to the IDR frame 502, and inserting the I-frame 504 into the encoded bitstream 506 according to its original frame sequence in the video data 208. Thus, the encoded bitstream 506 is stored in the data storage 126 and can be decoded for playback at a later time. Further, the stored bitstream 316 is used to generate the encoded bitstream 506 without re-encoding of decoded frames that are decoded from the original encoded bitstream 302.

Some encoding techniques utilize long-term reference (LTR) frames, such as H.264, H.265, and so forth. Thus, if the encoded frame 306 from which the frame copy 314 was generated is an LTR frame for one or more subsequent frames, special processing may need to be performed based on an LTR frame number for the encoded frame 306. One example of such processing is discussed below with reference to the scenario 600.

Further, encoding techniques typically used frame numbering to order frames in a video bitstream. If recording of a video bitstream starts at a frame other than an IDR frame (i.e., a frame other than frame 0), frame numbers for at least some frames of the final encoded bitstream may be modified to maintain a consecutive frame ordering. One example of such modification is discussed below with reference to the scenario 700.

Figure 6:
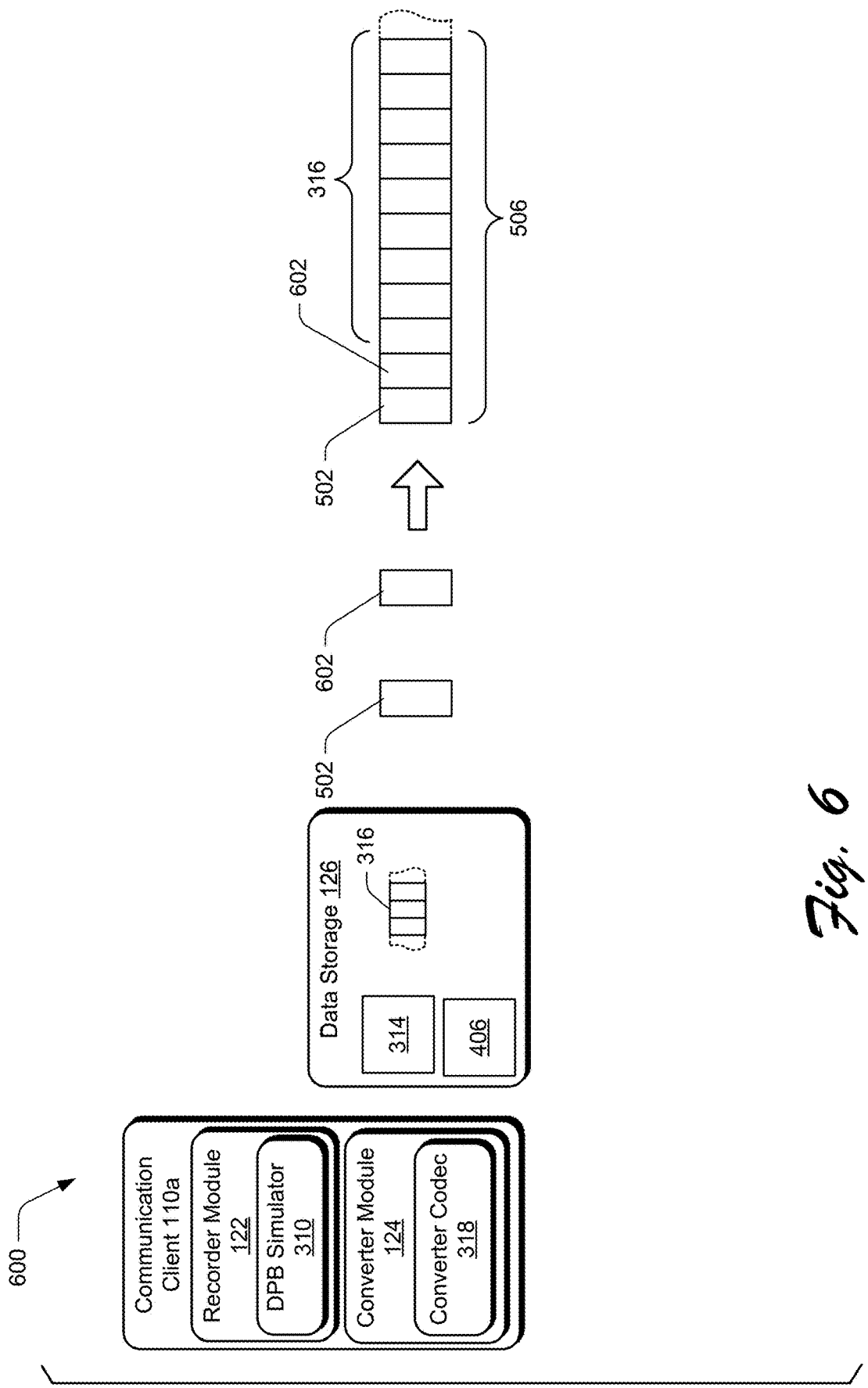
FIG. 6 depicts an example implementation scenario for generating an encoded bitstream based on a long-term reference (LTR) frame number for an initial frame in accordance with one or more implementations.

FIG. 6 depicts an example implementation scenario 600 for generating an encoded bitstream based on an LTR frame number for an initial frame. In at least some implementations, the scenario 600 is utilized as part of the scenario 500, discussed above.

The scenario 600 includes the frame copies 310, 406 and the stored bitstream 316. As part of generating a final encoded bitstream from this data, the converter module 124 determines whether the original encoded frame 306 is an LTR frame, and if so, an LTR number for the frame. In this case, the converter module 124 determines that the encoded frame 306 is an LTR frame. In a scenario where the encoded frame 306 is an LTR frame and its LTR frame number is 0, the converter module 124 may proceed with encoding the frame copy 314 of the encoded frame 306 as an IDR frame, since an IDR frame will have an LTR number of 0. In the scenario 600, however, the converter module 124 determines that the encoded frame 306 has an LTR number that is greater than 0. The encoded frame 306, for instance, has an LTR number of 1, 5, 6, or any other integer greater than 0.

Accordingly, since an IDR frame typically cannot have a non-zero LTR number, and to enable correct frame sequencing to be maintained based on the original bitstream 302, the converter codec 318 encodes the frame copy 314 as the IDR frame 502, as discussed above. Further, the converter codec 318 creates another encoded version of the frame copy 314 as an encoded p-frame 602. Thus, two encoded versions of the frame copy 314 are generated, the IDR frame 502 and the p-frame 602. Since an LTR number for a p-frame can be modified, the converter module 124 sets an LTR number of the p-frame 602 to match that of the encoded frame 306, i.e., to the non-zero LTR number of the original encoded frame 306.

Continuing with the scenario 600, the converter module 124 generates the encoded bitstream 506 starting with the IDR frame 502, concatenating the p-frame 602 to the IDR frame 502, and then concatenating the encoded frames of the stored bitstream 316 to the p-frame 602. Thus, when the encoded bitstream 506 is subsequently decoded (e.g., as part of playback of the recorded video), the LTR sequencing of the original encoded frames of the recorded video will be maintained. For instance, a codec can use the p-frame 602 to decode an encoded frame from the stored bitstream 316 that references the original encoded frame 306, since the LTR number for the p-frame 602 matches that of the encoded frame 306.

Figure 7:
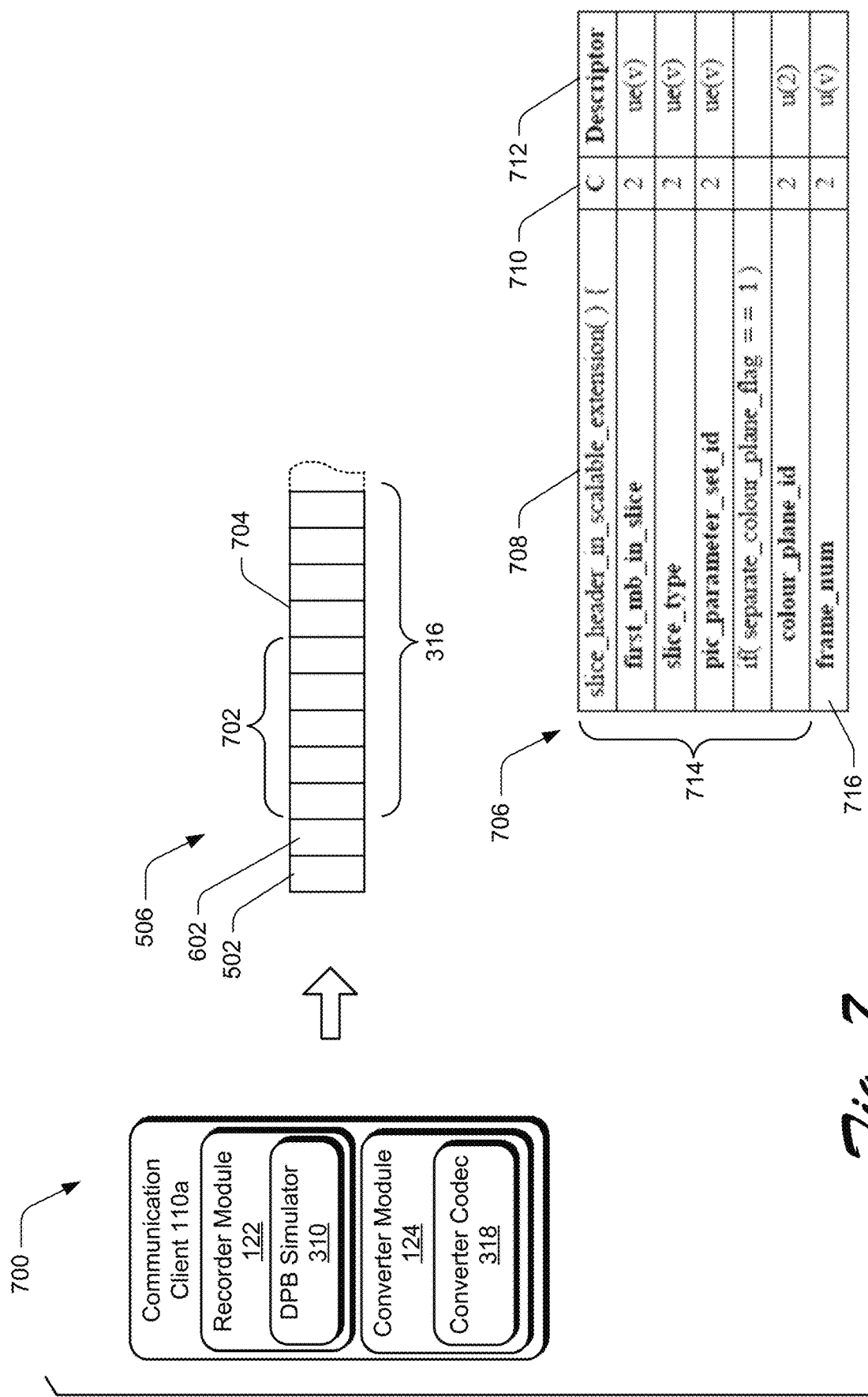
FIG. 7 depicts an example implementation scenario for renumbering frames as part of generating an encoded bitstream in accordance with one or more implementations.

FIG. 7 depicts an example implementation scenario 700 for renumbering frames as part of generating an encoded bitstream. In at least some implementations, the scenario 700 is implemented as part of the scenarios 500, 600 discussed above.

The scenario 700 includes the encoded bitstream 506, which is generated as discussed above. As part of generating the encoded bitstream 506, the converter module 124 modifies the frame numbers (e.g., frame_num values) for frames 702 of encoded frames of the stored bitstream 316 that are concatenated to the IDR frame 502, and the p-frame 602 in a scenario where the original encoded frame 306 is a non-zero LTR frame.

Generally, modifying the frame numbers for the frames 702 enables the individual frames of the encoded bitstream 506 to be presented in a consecutive order. As discussed above, encoding the frame copy 314 as the IDR frame 502 causes the IDR frame 502 to have a frame number of 0. However, since subsequent frames from the original encoded bitstream 302 may have frame numbers that do not follow consecutively from 0, the frame numbers can be modified. In this particular scenario, the frames 702 represent encoded frames from the bitstream 302 that were recorded following the original encoded frame 306. Further, the frames 702 have frame numbers that do not follow directly from 0. For instance, consider that the frames 702 have respective frame numbers of 5, 6, 7, 8, 9. The original encoded frame 306, for instance, has a frame number of 4, and thus the original frame numbers for the frames 702 are consecutive from 4. Further, consider that a frame 704 that follows after the frames 702 is an IDR frame. Since the frame 704 is an IDR frame, the frame numbering of the encoded bitstream 506 will reset to 0 at the frame 704, and thus further frame renumbering from the frame 704 is not necessary.

Accordingly, the converter module 124 renumbers the frames 702 to frames 1, 2, 3, 4, 5, respectively. For instance, a frame_num value for each of the frames 702 is modified such that the frame_num values for the frames 702 are now 1, 2, 3, 4, 5, respectively.

One example way for frame renumbering uses a slice header 706 for the frames 702. In this particular example, the slice header 706 is formatted according to the H.264 coding standard published by the International Telecommunication Union, Telecommunication Standardization Sector (ITU-T). The slice header 706 includes various syntax elements 708 that are defined for the frames 702, categories 710 that can be defined for each of the syntax elements 708, and descriptors 712 that describe a method of coded representation for each of the syntax elements 708.

The slice header 706 includes syntax elements 714, followed by a frame_num 716 syntax element. Accordingly, to reset the frame_num 716 for each of the frames 702, the converter module 124 determines a number of bits used to define the syntax elements 714. Once this value is known, the frame_num element can be defined by skipping those bits in the slice header 706 to locate the frame_num 716 in the slice header 706, and modifying the bits for frame_num 716 as discussed above.

According to one or more implementations, the number of bits used to define the frame_num 716 can be determined from an SPS for the encoded bitstream 506, such as included as part of the IDR frame 502. Thus, the frame_num values for the frames 702 are modified to enable consecutive frame numbering for the encoded bitstream 506 and to facilitate proper decoding of the encoded bitstream 506, such as during a playback of the recorded video data 208.

Generally, the different implementation scenarios may be combined and configured in various ways to provide adaptable techniques for recording video from a bitstream in accordance with diverse implementations. Further, certain of the scenarios are optional and apply under certain conditions, such as when LTR and/or frame renumbering is needed.

Having discussed some example implementation scenarios, consider now a discussion of some example procedures in accordance with one or more implementations.

The following discussion describes some example procedures for recording video from a bitstream in accordance with one or more implementations. The example procedures may be employed in the environment 100 of FIG. 1, the system 1300 of FIG. 13, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102) and/or at a network-based service, such as the communication service 118.

Figure 8:
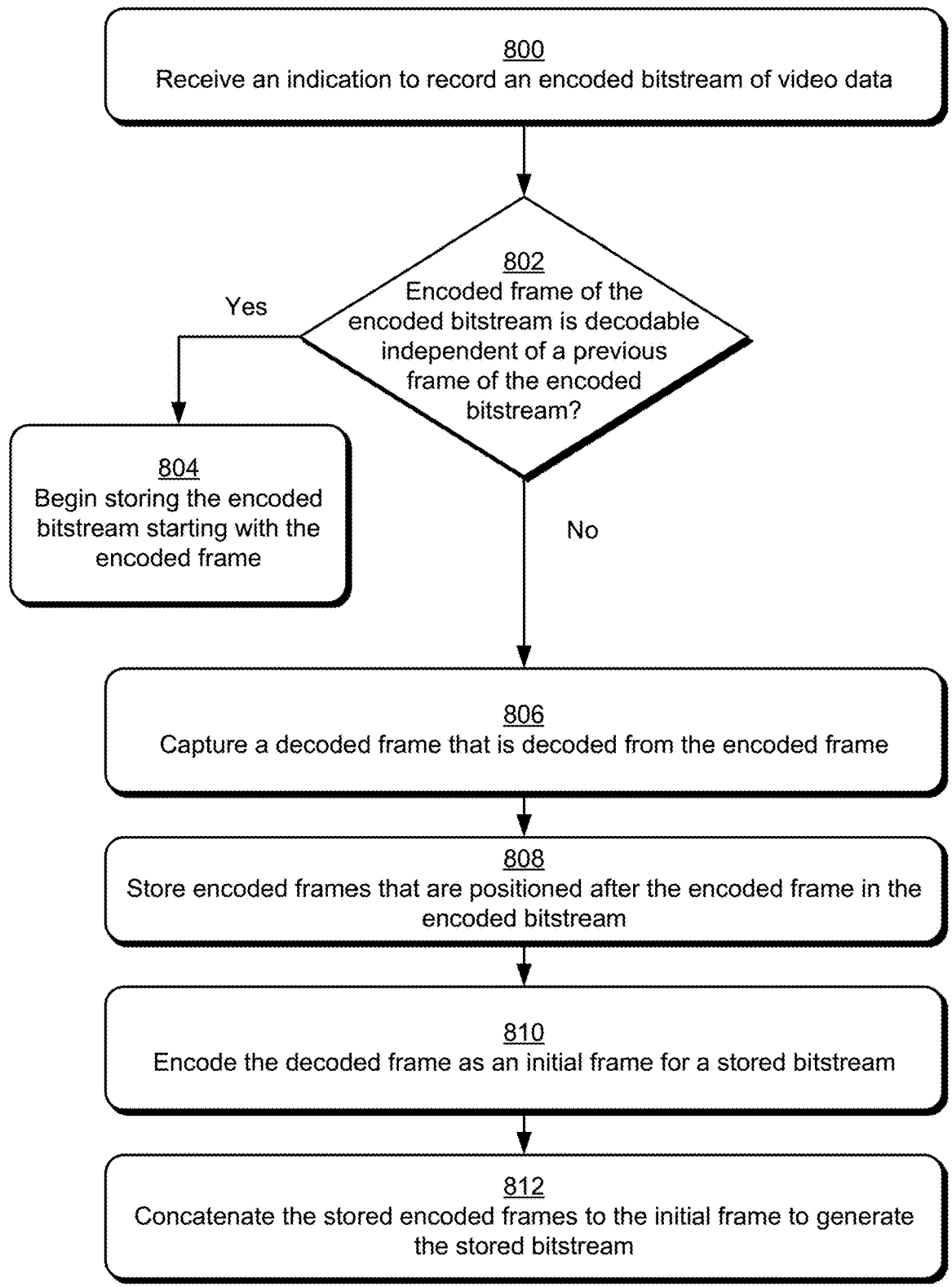
FIG. 8 is a flow diagram that describes steps in a method for recording an encoded bitstream in accordance with one or more implementations.

FIG. 8 is a flow diagram that describes steps in a method in accordance with one or more implementations. The method describes an example procedure for recording an encoded bitstream in accordance with one or more implementations.

Step 800 receives an indication to record an encoded bitstream of video data. A user, for instance, provides input to initiate video recording, such as via interaction with the communication client 110a and/or the communication service 118. Alternatively or additionally, an automated process initiates video recording, e.g., independent of user input to initiate the recording process. In at least some implementations, the video data represents a real-time stream of video data, such as part of a communication session between the client device 102 and the endpoint device 116. Further, the recording process may be initiated after video data is streaming for a time, such as 30 seconds, a minute, 5 minutes, and so forth.

Step 802 ascertains whether an encoded frame of the encoded bitstream is decodable independent of a previous frame of the encoded bitstream. The encoded frame, for instance, represents a frame that is being decoded when the recording process is initiated. Generally, the recorder module 122 may determine whether the encoded frame is decodable in various ways. The recorder module 122, for instance, monitors the DPB 312 of the codec 120a for information about frames that are being decoded and/or that are buffered in the DPB 312.

If the encoded frame is decodable independent of a previous frame ("Yes"), step 804 begins storing the encoded bitstream starting with the encoded frame. The recorder module 122, for instance, determines that the encoded frame is an IDR frame and thus that no subsequent frames will reference a frame prior to the encoded frame. Accordingly, the recorder module 122 may record the encoded frame and subsequent encoded frames of the encoded bitstream as a recorded encoded bitstream without requiring re-encoding of decoded frames to generate the encoded bitstream for recording.

If the encoded frame is not decodable independent of a previous frame ("No"), step 806 captures a decoded frame that is decoded from the encoded frame. The recorder module 122, for instance, determines that the encoded frame references a previous frame of the encoded bitstream that is not available for decoding the encoded frame. The previous frame, for instance, has already been decoded, displayed, and removed from the DPB 312. Accordingly, the recorder module 122 captures and stores a decoded version of the encoded frame, such as from the DPB 312. In at least some implementations, the recorder module 122 stores the decoded frame in the data storage 126 for later processing. Generally, the decoded version represents a raw image that is displayable on its own without reference to a different frame.

Step 808 stores encoded frames that are positioned after the encoded frame in the encoded bitstream. Generally, the encoded frames are captured and stored without re-encoding of decoded frames prior to said storing. For instance, as the encoded frames arrive at the client device 102 (or are otherwise obtained), the recorder module 122 stores copies of the encoded frames in the data storage 126. Generally, the encoded frames are stored without requiring the frames to be re-encoded after being decoded by the codec 120a.

Step 810 encodes the decoded frame as an initial frame for a stored bitstream. For instance, the converter codec 318 encodes the decoded frame as a first frame to be used for generating a stored bitstream. The converter codec 318, for example, encodes the decoded frame as an IDR frame. The converter codec 318 may also generate various information for the IDR frame, such as a PPS, an SPS, and so forth.

Step 812 concatenates the stored encoded frames to the initial frame to generate the stored bitstream. The converter module 124, for example, links the stored encoded frames to the initial frame to generate the stored bitstream, which is stored for later playback. Different variations and implementation details on this procedure are discussed above, as well as in the procedures described below.

Figure 9:
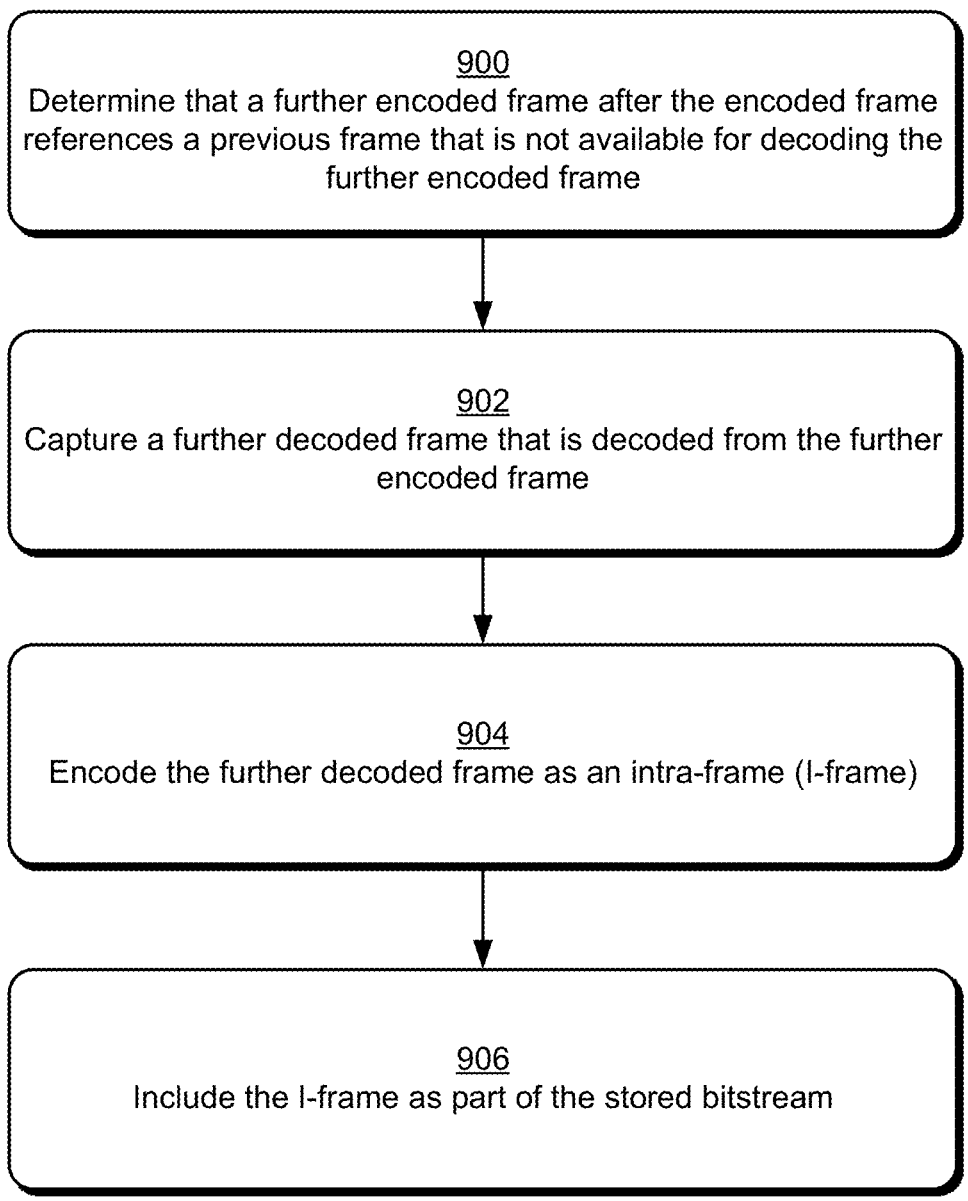
FIG. 9 is a flow diagram that describes steps in a method for capturing a further encoded frame that occurs after an initial frame in accordance with one or more implementations.

FIG. 9 is a flow diagram that describes steps in a method in accordance with one or more implementations. The method describes an example procedure for capturing a further encoded frame that occurs after the initial frame discussed above in FIG. 8.

Step 900 determines that a further encoded frame after the encoded frame references a previous frame that is not available for decoding the further encoded frame. The recorder module 122, for instance, identifies a further encoded frame that occurs after the encoded frame in the encoded bitstream and that references a previous frame that is not available to decode to further encoded frame. For example, the further encoded frame is a p-frame that references a frame that occurred prior to the recording process being initiated, and is thus not available to be stored for later decoding of the further encoded frame. Consider, for example, that the codec 120a previously decoded the further encoded frame using the previous frame, and then discarded the previous frame from the DPB 312. Thus, the previous frame is not available to be recorded by the recorder module 122.

Step 902 captures a further decoded frame that is decoded from the further encoded frame. The further decoded frame, for instance, is buffered in the DPB 312. Thus, the recorder module 122 captures a copy of the further decoded frame and stores the decoded frame in the data storage 126. Generally, the further decoded frame represents an image that is displayable independent of a different frame and/or image.

Step 904 encodes the further decoded frame as an intra-frame (I-frame). For instance, the converter codec 318 encodes the further decoded frame as an I-frame that is decodable independent of a different frame.

Step 906 includes the I-frame as part of the stored bitstream. The converter module 124, for example, concatenates the I-frame along with the initial frame and the stored encoded frames discussed above to generate the stored bitstream.

Figure 10:
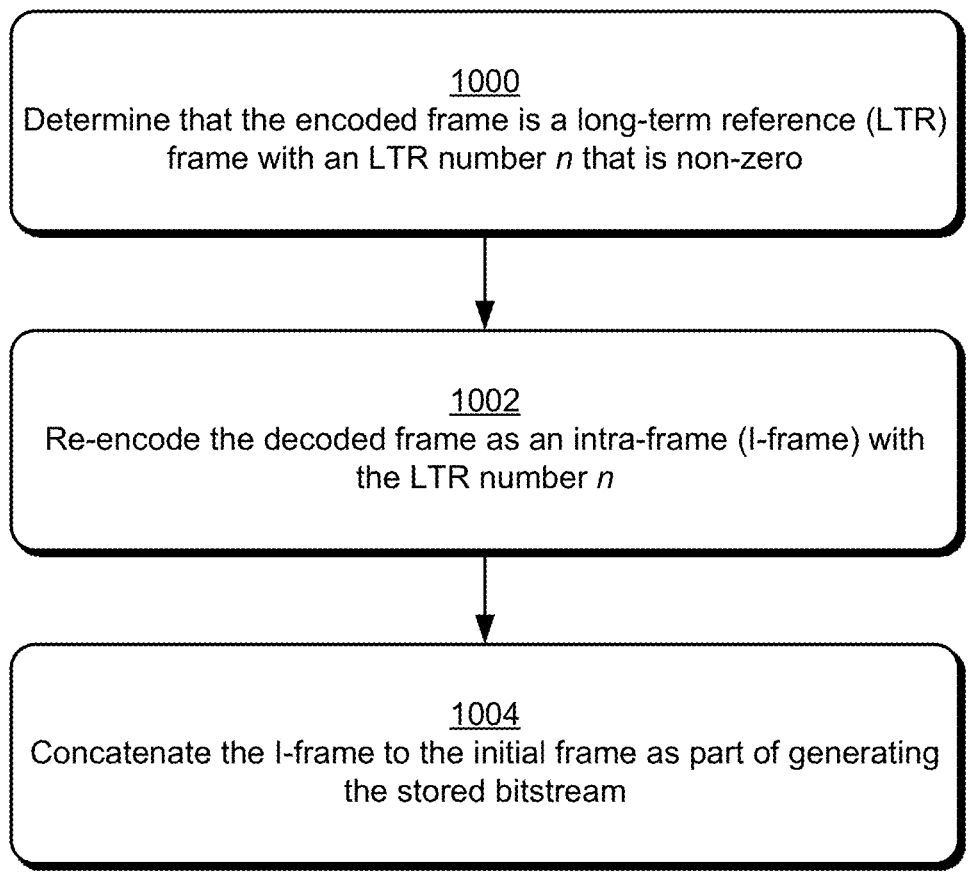
FIG. 10 is a flow diagram that describes steps in a method for handling an LTR frame as part of generating a stored bitstream in accordance with one or more implementations.

FIG. 10 is a flow diagram that describes steps in a method in accordance with one or more implementations. The method describes an example procedure for handling an LTR frame as part of generating the stored bitstream discussed above.

Step 1000 determines that the encoded frame is a long-term reference (LTR) frame with an LTR number n that is non-zero. The recorder module 122, for example, determines that the encoded frame referenced in step 802, above, is an LTR frame that has an LTR number n that is greater than zero.

Step 1002 re-encodes the decoded frame as an intra-frame (I-frame) with the LTR number n. For instance, the converter module 124 determines that an I-frame version of the decoded frame is to be generated. Thus, the converter codec 318 encodes another version of the decoded frame as an LTR I-frame with the LTR number n.

Step 1004 concatenates the I-frame to the initial frame as part of generating the stored bitstream. The converter module 124, for example, inserts the I-frame after the initial frame in the stored encoded bitstream. As discussed above, the initial frame may be an IDR frame, and thus cannot have an LTR number that is greater than 0. Accordingly, this procedure enables an LTR frame from a recorded bitstream to be maintained during a recording process in case a subsequent encoded frame references the LTR frame for decoding.

Figure 11:
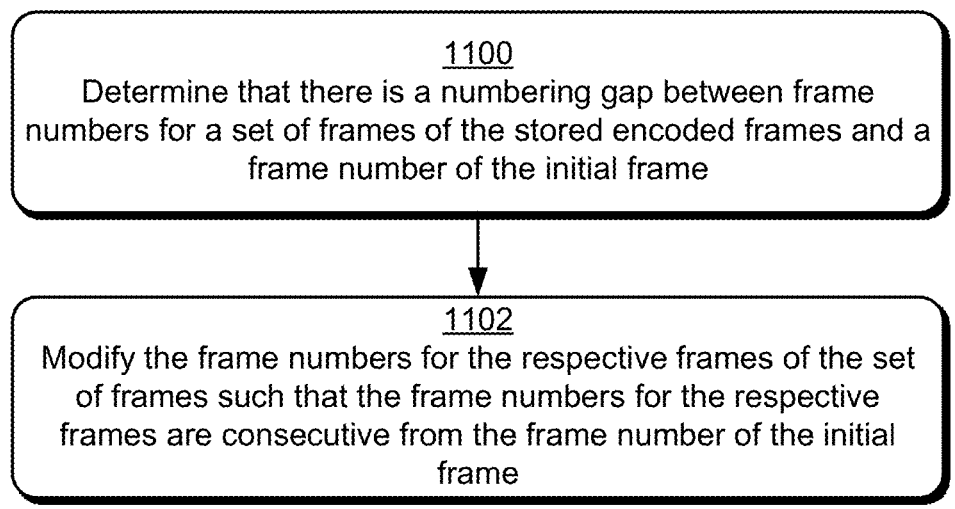
FIG. 11 is a flow diagram that describes steps in a method for frame renumbering as part of generating a stored bitstream in accordance with one or more implementations.

FIG. 11 is a flow diagram that describes steps in a method in accordance with one or more implementations. The method describes an example procedure for frame renumbering as part of generating the stored bitstream discussed above.

Step 1100 determines that there is a numbering gap between frame numbers for a set of frames of the stored encoded frames and a frame number of the initial frame. For instance, a set of the stored encoded frames that are captured after the initial encoded frame discussed above have frame numbers (e.g., frame_num values) that are non-consecutive with a frame number of the initial frame of the stored bitstream. Generally, this may occur because when a decoded version of the original encoded frame is re-encoded as an IDR frame, its frame number will be 0. Thus, if the original encoded frame had a different frame number (e.g., greater than 0), encoded frames that follow the original encoded frame will not be consecutive starting from 0. That is, there will be a frame numbering gap between the initial encoded frame of the stored bitstream, and subsequent encoded frames that are captured from the original bitstream.

Step 1102 modifies the frame numbers for the respective frames of the set of frames such that the frame numbers for the respective frames are consecutive from the frame number of the initial frame. The converter module 124, for example, modifies each frame number for each frame of the set of frames to remove the numbering gap between the initial frame and the set of frames. As discussed above, there are scenarios where a different frame is inserted after the initial frame. For instance, in a scenario where the initial frame is created from a non-zero LTR frame, a p-frame version of the initial can be inserted after the initial frame. In such a scenario, the set of frames can be renumbered to be consecutively numbered from the different frame.

Figure 12:
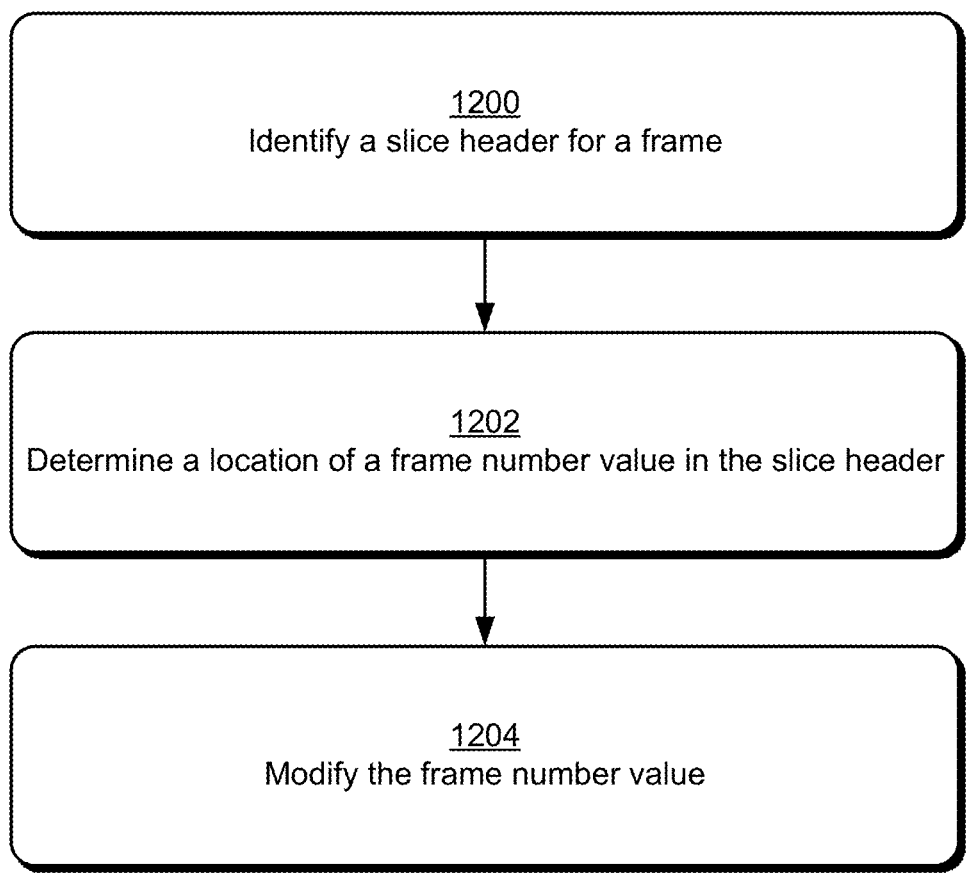
FIG. 12 is a flow diagram that describes steps in a method for modifying a frame number as part of generating a stored bitstream in accordance with one or more implementations.

FIG. 12 is a flow diagram that describes steps in a method in accordance with one or more implementations. The method describes an example procedure for modifying a frame number as part of generating the stored bitstream discussed above. The method, for instance, describes an example way for performing step 1102 discussed above.

Step 1200 identifies a slice header for a frame. The converter module 124, for instance, identifies a particular slice header for an encoded frame.

Step 1202 determines a location of a frame number value in the slice header. In at least some implementations, the slice header follows a standardized format such that a location of the frame number value can be located based on the standardized format. Alternatively or additionally, information for a bitstream, such as a PPS or an SPS can identify a location of the frame number value in the slice header. Accordingly, the converter module 124 determines a location of bits that define the frame number (e.g., frame_num) value.

Step 1204 modifies the frame number value. The converter module 124, for instance, modifies bits that define the frame number value to match a target frame number. In at least some implementations, a number of bits used to define a frame number can be determined based on an information element related to the frame, such as a PPS or an SPS. Thus, based on the known number of bits, the bits that define the frame number value are modified to match a target frame number value.

Generally, this process can be repeated multiple times for a set of frames of an encoded bitstream to generate a consecutive set of frame number values for the set of frames. This facilitates proper decoding and playback of the encoded bitstream.

Having discussed some example procedures, consider now a discussion of an example system and device in accordance with one or more implementations.

Figure 13:
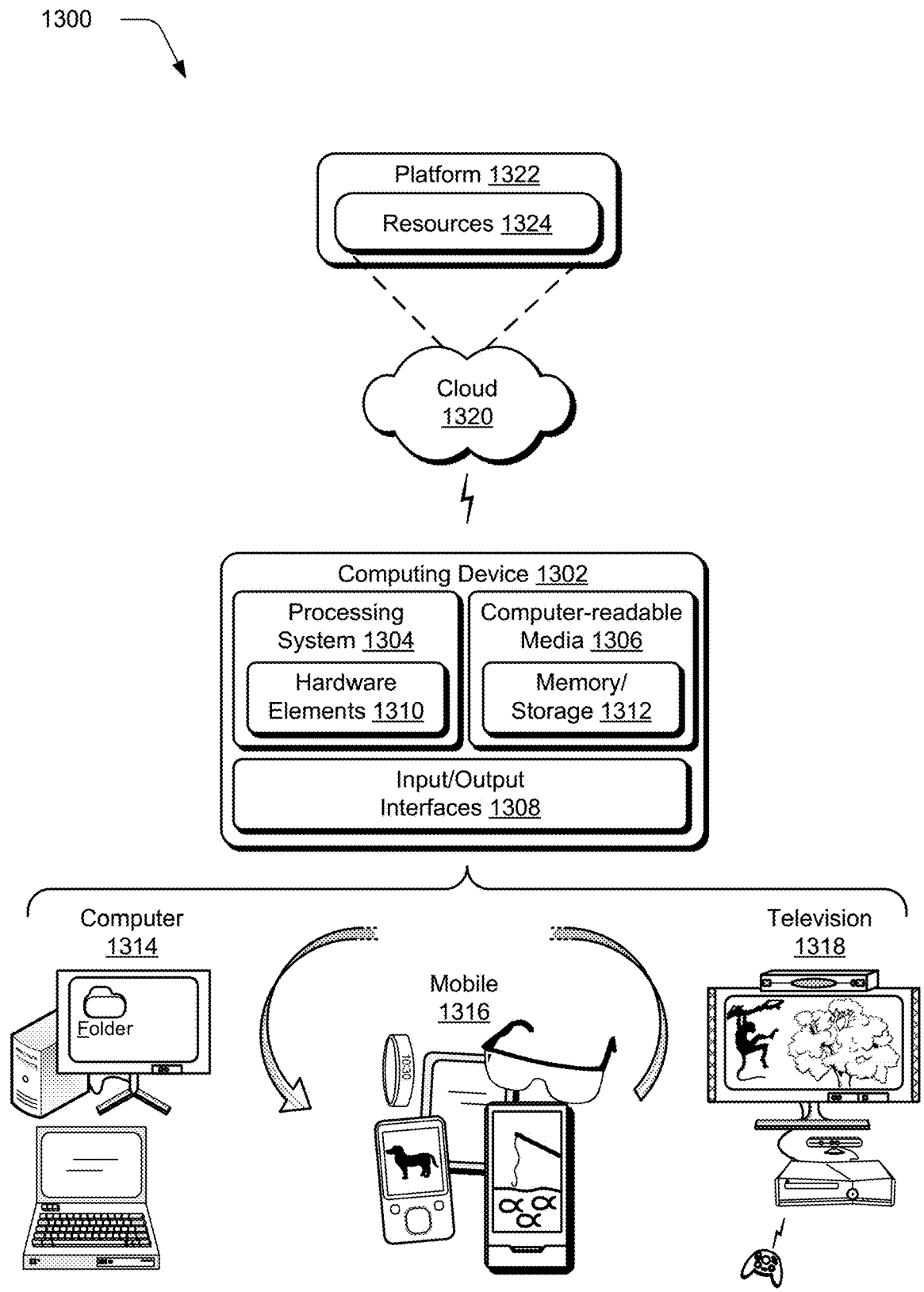
FIG. 13 illustrates an example system and computing device as described with reference to FIG. 1, which are configured to implement implementations of techniques described herein.

FIG. 13 illustrates an example system generally at 1300 that includes an example computing device 1302 that is representative of one or more computing systems and/or devices that may implement various techniques described herein. For example, the client device 102, the endpoint device 116, and/or the communication service 118 discussed above with reference to FIG. 1 can be embodied as the computing device 1302. The computing device 1302 may be, for example, a server of a service provider, a device associated with the client (e.g., a client device), an on-chip system, and/or any other suitable computing device or computing system.

The example computing device 1302 as illustrated includes a processing system 1304, one or more computer-readable media 1306, and one or more Input/Output (I/O) Interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth.

Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1310 and computer-readable media 1306 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules that are executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, portable music player, portable gaming device, a tablet computer, a wearable device, a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. For example, functionalities discussed with reference to the recording module 122, the converter module 124, and/or the communication service 118 may be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Techniques for recording video from a bitstream are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for generating a stored bitstream, the system comprising: at least one processor; and one or more computer-readable storage media including instructions stored thereon that, responsive to execution by the at least one processor, cause the system perform operations including: receiving an indication to record an encoded bitstream of video data; capturing a decoded frame that is decoded from an encoded frame of the encoded bitstream; storing encoded frames that are positioned after the encoded frame in the encoded bitstream and without re-encoding decoded versions of the encoded frames prior to said storing; encoding the decoded frame as an initial frame for a stored bitstream; and concatenating the stored encoded frames to the initial frame to generate the stored bitstream.

In addition to any of the above described systems, any one or combination of: wherein said capturing is responsive to determining that the encoded frame references a previous frame in the encoded bitstream that is not available for decoding the encoded frame; wherein said capturing is responsive to determining that the encoded frame is a predicted frame (p-frame) that references a previous frame in the encoded bitstream that is not available for decoding the encoded frame; wherein said capturing is responsive to determining that the encoded frame references a previous frame in the encoded bitstream that is not available for decoding the encoded frame, and said determining comprises monitoring a decoded picture buffer (DPB) of a codec that decodes the encoded frame for information about the encoded frame; wherein the operations are performed by the system while one or more portions of the encoded bitstream are decoded and output for display; wherein said encoding comprises encoding the decoded frame as an Instantaneous Decoder Refresh (IDR) frame; wherein the encoded frame is a predicted frame (p-frame), and said encoding comprises encoding the decoded frame as an Instantaneous Decoder Refresh (IDR) frame; wherein the operations further include: determining that a further encoded frame after the encoded frame of the encoded frames references a previous frame that is not available for decoding the further encoded frame; capturing a further decoded frame that is decoded from the further encoded frame; and encoding the further decoded frame as an intra-frame (I-frame); and including the I-frame as part of the stored bitstream; wherein said encoding comprises encoding the decoded frame as an Instantaneous Decoder Refresh (IDR) frame, and wherein the operations further include: determining that the encoded frame is a long-term reference (LTR) frame with an LTR number n that is non-zero; re-encoding the decoded frame as an intra-frame (I-frame) with the LTR number n; and concatenating the I-frame to the initial frame as part of generating the stored bitstream; wherein the operations further include: determining that there is a numbering gap between frame numbers for a set of frames of the stored encoded frames and a frame number of the initial frame; and modifying the frame numbers for the respective frames of the set of frames such that the frame numbers for the respective frames are consecutive from the frame number of the initial frame; wherein the operations further include: determining that there is a numbering gap between frame numbers for a set of frames of the stored encoded frames and a frame number of the initial frame; and modifying the frame numbers for the respective frames of the set of frames such that the frame numbers for the respective frames are consecutive from the frame number of the initial frame, wherein said modifying comprises modifying one or more frame number values in one or more slice headers for the set of frames.

A computer-implemented method for generating a stored bitstream, the method comprising: receiving an indication to record an encoded bitstream of video data; ascertaining whether an encoded frame of the encoded bitstream is decodable independent of a previous frame of the encoded bitstream; capturing a decoded frame that is decoded from the encoded frame and based on determining that the encoded frame is not decodable independent of the previous frame; storing encoded frames that are positioned after the encoded frame in the encoded bitstream and without re-encoding decoded versions of the encoded frames prior to said storing; encoding the decoded frame as an initial frame for a stored bitstream; and concatenating the stored encoded frames to the initial frame to generate the stored bitstream.

In addition to any of the above described methods, any one or combination of: wherein said ascertaining comprises determining, based on a decoded picture buffer (DPB) of a codec that decodes the encoded frame, whether the encoded frame is decodable independent of a previous frame of the encoded bitstream; wherein said determining that the encoded frame is not decodable independent of the previous frame comprises determining that the encoded frame references a different frame of the encoded bitstream that is not available; wherein said capturing comprises capturing the decoded frame from a decoded picture buffer (DPB) of a codec that decodes the encoded frame; further comprising: determining that a different encoded frame of the encoded frames references a frame of the encoded bitstream that is not available for decoding the different encoded frame; capturing a different decoded frame that is decoded from the different encoded frame; and encoding the different decoded frame as an intra-frame (I-frame); and including the I-frame as part of the stored bitstream; wherein said encoding comprises encoding the decoded frame as an Instantaneous Decoder Refresh (IDR) frame, and wherein the operations further include: determining that the encoded frame is a long-term reference (LTR) frame with an LTR number n that is non-zero; re-encoding the decoded frame as an intra-frame (I-frame) with the LTR number n; and concatenating the I-frame to the IDR frame as part of generating the stored bitstream; further comprising: determining that there is a numbering gap between frame numbers for a set of frames of the stored encoded frames and a frame number of the initial frame; and modifying the frame numbers for the respective frames of the set of frames such that the frame numbers for the respective frames are consecutive from the frame number of the initial frame, wherein said modifying comprises modifying one or more frame number values in one or more slice headers for the set of frames.

A computer-implemented method for generating a stored bitstream, the method comprising: capturing a decoded frame that is decoded from an encoded frame of an encoded bitstream of video data; storing encoded frames that are positioned after the encoded frame in the encoded bitstream and without re-encoding decoded versions of the encoded frames prior to said storing; and encoding the decoded frame as an initial frame for a stored bitstream and concatenating the stored encoded frames to the initial frame to generate the stored bitstream.

In addition to any of the above described methods, any one or combination of: wherein said capturing is based on determining that the encoded frame refers to one or more previous frames of the encoded bitstream that are not available.

What is claimed is:

1. A device for recording a video stream, comprising:
a processor; and
a memory in communication with the processor, the memory comprising executable instructions that, when executed by the processor, cause the processor to control the device to perform functions of:
receiving a first video stream comprising a first encoded frame and a plurality of second encoded frames following the first encoded frame in sequence;
decoding the received first video stream and outputting the decoded first video stream;
while the first video stream is being decoded and output, receiving an indication to record the received first video stream; and
in response to receiving the indication:
capturing a first decoded frame that is decoded from the first encoded frame of the first video stream;
storing, in a data storage, the second encoded frames of the first video stream without decoding and re-encoding the second encoded frames prior to storing the second encoded frames;
encoding the captured first decoded frame to generate an initial frame for a recorded second video stream; and
concatenating the stored second encoded frames to the initial frame to generate the recorded second video stream.

2. The device of claim 1, wherein the instructions, when executed by the processor, further cause the processor to control the device to perform a function of determining, prior to capturing the first decoded frame, that the first encoded frame references a previous frame in the first video stream that is not available for decoding the first encoded frame.

3. The device of claim 1, wherein the instructions, when executed by the processor, further cause the processor to control the device to perform a function of determining, prior to capturing the first decoded frame, that the first encoded frame is a predicted frame (p-frame) that references a previous frame in the first video stream that is not available for decoding the first encoded frame.

4. The device of claim 1, wherein:
the instructions, when executed by the processor, further cause the processor to control the device to perform a function of determining, prior to capturing the first decoded frame, that the first encoded frame references a previous frame in the first video stream that is not available for decoding the first encoded frame, and
for determining that the first encoded frame references a previous frame, the instructions, when executed by the processor, further cause the processor to control the device to perform a function of monitoring a decoded picture buffer (DPB) of a codec that decodes the first encoded frame for information about the first encoded frame.

5. The device of claim 1, wherein the instructions, when executed by the processor, further cause the processor to control the device to perform a function of decoding and outputting the first video stream for display.

6. The device of claim 1, wherein, for encoding the captured first decoded frame, the instructions, when executed by the processor, further cause the processor to control the device to perform a function of encoding the first decoded frame as an Instantaneous Decoder Refresh (IDR) frame.

7. The device of claim 1, wherein:
the first encoded frame comprises a predicted frame (P-frame), and
for encoding the captured first decoded frame, the instructions, when executed by the processor, further cause the processor to control the device to perform a function of encoding the first decoded frame as an Instantaneous Decoder Refresh (IDR) frame.

8. The device of claim 1, wherein the instructions, when executed by the processor, further cause the processor to control the device to perform functions of:
determining that a third encoded frame following the first encoded frame of the first video stream references a previous frame that is not available for decoding the third encoded frame;
capturing a second decoded frame that is decoded from the third encoded frame;
encoding the second decoded frame as an intra-frame (I-frame); and
including the I-frame as part of the recorded second video stream.

9. The device of claim 1, wherein;
for encoding the captured first decoded frame the instructions, when executed by the processor, further cause the processor to control the device to perform a function of encoding the first decoded frame as an Instantaneous Decoder Refresh (IDR) frame, and
the instructions, when executed by the processor, further cause the processor to control the device to perform functions of:
determining that the first encoded frame is a long-term reference (LTR) frame with an LTR number n that is non-zero; and
re-encoding the first decoded frame as an intra-frame (I-frame) with the LTR number n, and
to concatenate the stored second encoded frames to the initial frame, the instructions further include instructions that, when executed by the processor, cause the processor to control the device to perform a function of concatenating the I-frame to the initial frame.

10. The device of claim 1, wherein the instructions, when executed by the processor, further cause the processor to control the device to perform functions of:
determining that there is a numbering gap between frame numbers for a set of frames of the stored second encoded frames and a frame number of the initial frame; and
modifying the frame numbers for the respective frames of the set of frames such that the frame numbers for the respective frames are consecutive from the frame number of the initial frame.

11. The device of claim 1, wherein the instructions, when executed by the processor, further cause the processor to control the device to perform functions of:
determining that there is a numbering gap between frame numbers for a set of frames of the stored second encoded frames and a frame number of the initial frame; and
modifying the frame numbers for the respective frames of the set of frames such that the frame numbers for the respective frames are consecutive from the frame number of the initial frame,
wherein, to modify the frame numbers, the instructions further include instructions that, when executed by the processor, cause the processor to control the device to perform a function of modifying one or more frame number values in one or more slice headers for the set of frames.

12. The device of claim 1, wherein, for capturing the first decoded frame, the instructions, when executed by the processor, further cause the processor to control the device to perform functions of:
determining that the first encoded frame references a previous encoded frame in the first video stream that has been decoded prior to receiving the indication; and
in response to determining that the first encoded frame references the previous encoded frame, capturing the first decoded frame from a buffer for a codec configured to decode the first video stream.

13. The device of claim 1, wherein the first video stream comprises a long-term reference (LTR) frame.

14. A method of operating a device for recording a video stream, comprising:
receiving a first video stream comprising a first encoded frame and a plurality of second encoded frames following the first encoded frame in sequence;
decoding the received first video stream and outputting the decoded first video stream;
while the first video stream is being decoded and output, receiving an indication to record the received first video stream; and
in response to receiving the indication:
capturing a first decoded frame that is decoded from the first encoded frame of the first video stream;
storing, in a data storage, the second encoded frames of the first video stream without decoding and re-encoding the second encoded frames prior to storing the second encoded frames;
encoding the captured first decoded frame to generate an initial frame for a recorded second video stream; and
concatenating the stored second encoded frames to the initial frame to generate the recorded second video stream.

15. The method of claim 14, further comprising determining, prior to capturing the first decoded frame, that the first encoded frame references a previous frame in the first video stream that is not available for decoding the first encoded frame.

16. The method of claim 15, wherein determining that the first encoded frame references a previous frame comprises monitoring a decoded picture buffer (DPB) of a codec that decodes the first encoded frame for information about the first encoded frame.

17. The method of claim 14, further comprising determining, prior to capturing the first decoded frame, that the first encoded frame is a predicted frame (p-frame) that references a previous frame in the first video stream that is not available for decoding the first encoded frame.

18. The method of claim 14, wherein encoding the captured first decoded frame to generate the initial frame comprises encoding the first decoded frame as an Instantaneous Decoder Refresh (IDR) frame.

19. The method of claim 14, wherein the first encoded frame comprises a predicted frame (P-frame), and encoding the captured first decoded frame comprises encoding the first decoded frame as an Instantaneous Decoder Refresh (IDR) frame.

20. The method of claim 14, further comprising:
determining that a third encoded frame following the first encoded frame references a previous frame that is not available for decoding the third encoded frame;

capturing a second decoded frame that is decoded from the third encoded frame;

encoding the second decoded frame as an intra-frame (I-frame); and including the I-frame as part of the recorded second video stream.

21. The method of claim 14, wherein encoding the captured first decoded frame comprises encoding the first decoded frame as an Instantaneous Decoder Refresh (IDR) frame, the method further comprising:

determining that the first encoded frame is a long-term reference (LTR) frame with an LTR number n that is non-zero; and re-encoding the first decoded frame as an intra-frame (I-frame) with the LTR number n, wherein concatenating the stored second encoded frames to the initial frame comprises concatenating the I-frame to the initial frame.

22. The method of claim 14, further comprising:

determining that there is a numbering gap between frame numbers for a set of frames of the stored second encoded frames and a frame number of the initial frame; and modifying the frame numbers for the respective frames of the set of frames such that the frame numbers for the respective frames are consecutive from the frame number of the initial frame.

23. The method of claim 22, wherein modifying the frame numbers comprises modifying one or more frame number values in one or more slice headers for the set of frames.

24. The method of claim 14, wherein capturing the first decoded frame comprises:

determining that the first encoded frame references a previous encoded frame in the first video stream that has been decoded prior to receiving the indication; and in response to determining that the first encoded frame references the previous encoded frame, capturing the first decoded frame from a buffer for a codec configured to decode the first video stream.

25. The method of claim 14, wherein the first video stream comprises a long-term reference (LTR) frame.

* * * * *